March 24, 1959 F. S. MALICK 2,879,463

COMPUTER IMPEDANCE CHANGING WITH MAGNETIC AMPLIFIER

Filed April 20, 1954

INVENTOR

Franklin S. Malick

BY Walter S. Paul

ATTORNEYS 2,879,463

COMPUTER IMPEDANCE CHANGING WITH MAGNETIC AMPLIFIER

Franklin S. Malick, Milwaukee, Wis., assignor, by mesne assignments, to the United States of America as represented by the Secretary of the Navy Application April 20, 1954, Serial No. 424,526

2 Claims. (Cl. 321—25)

(Granted under Title 35, U. S. Code (1952), sec. 266)

This invention relates to an impedance changing device for potentiometer multiplier circuits.

In circuits of this type a voltage is applied to one potentiometer corresponding to a given function to be multiplied with a second function and the potentiometer tap is rotated in correspondence with the second function. The product appears as a voltage across a second potentiometer connected across the tapped portion of the first potentiometer. In order to maintain linearity the second potentiometer must be of higher impedance than the first, and if successive multiplications are to be made the final potentiometer may reach an impractical impedance.

It is the general object of this invention, therefore, to provide a multiplier circuit in which a series of potentiometers may be used in multiplying relationship without development of excessive terminal impedance. An object also is to provide a circuit readily usable either for multiplying or adding. A further object is to provide a multiplier circuit wherein the resistance of the successive potentiometers may be of equal value.

Further objects include provision of circuit multiplying means where stages can be added without introducing direct metallic connections between stages; where one alternating current source may be used for a series of cascaded stages; and where the last stage impedance may be low enough to permit the signal to be followed up by servomechanism.

Other objects and advantages will appear on reference to the following detailed description and accompanying drawing wherein.

Figure 1:
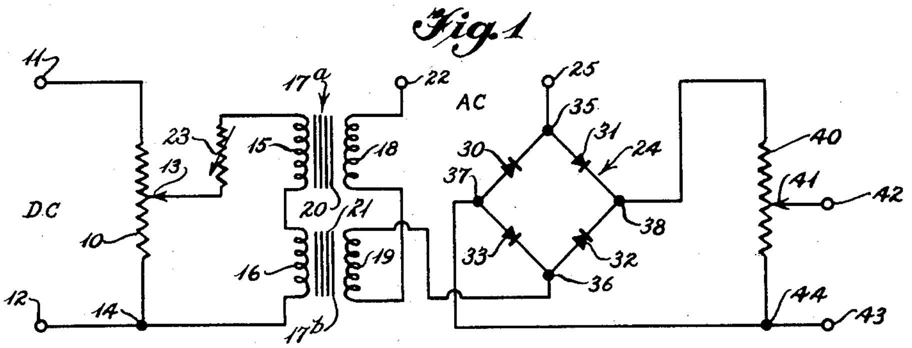
Fig. 1 is a circuit diagram showing the impedance changing device in simplified form.

In Fig. 1 a magnetic amplifier including the series-connected saturable reactors 17*a* and 17*b*, is connected between input and output potential measuring units as exemplified by potentiometers 10 and 40. Potentiometer 10 receives direct current from terminals 11 and 12 and potentiometer 40 has connection to load terminals 42 and 43, slide contact 41, giving the usual voltage control.

In order to control the magnetic amplifier in accordance with the setting of the potentiometer 10, as at 13, control windings 15 and 16 are disposed in inductive relationship with the magnetic core members 20 and 21 of the magnetic amplifier. The magnitude of current flow through the control windings 15 and 16 controls the saturation of core members 20 and 21 and thus the impedance of load windings 18 and 19, respectively. In turn, the impedance of load windings 18 and 19 controls the magnitude of the rectified voltage across potentiometer 40.

An alternating current supply for the load winding is obtained from source terminals 22 and 25; and a rectifier 24 is connected between terminal 25 and load winding 19 in order to supply a rectified voltage to potentiometer 40. This rectifier, as here disclosed, is of the well-known full wave bridge type having four rectifying elements 30, 31, 32 and 33 connected in series and with elements 30 and 31 in opposition to elements 32 and 33. The A.-C. input is connected between elements 30—31 and 32—33 at points 35 and 36 and the D.-C. output between elements 30—33 and 31—32 at points 37 and 38. The D.-C. output points 37 and 38 connect through potentiometer 40 to outlet terminals 42 and 43; slide contact 41 permitting the usual voltage control.

Figure 2:
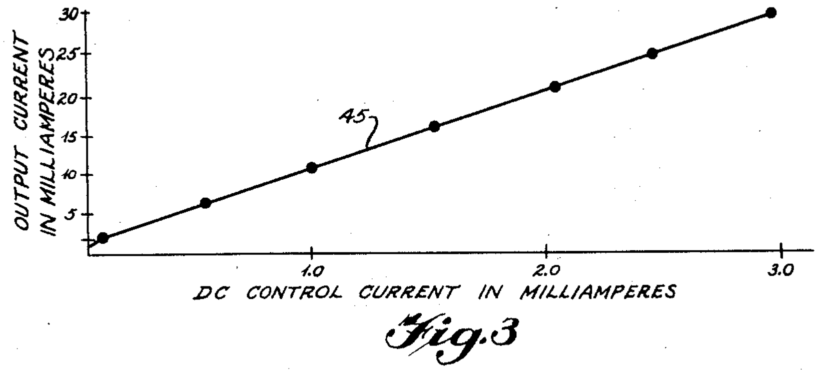
Fig. 2 shows a graph indicating load change with control change.

The circuit as described is seen to be the cascaded form used, for example, for multiplication in electrical computers, with a saturable core reactor type of magnetic amplifier connected between successive potentiometers 10 and 40. As shown, the first potentiometer 10—13 forms the direct current control circuit for the amplifier and the second potentiometer 40 the load circuit. In a magnetic amplifier of this type the control and load circuits are proportional over a large range in a manner similar to a current transformer, the D.-C. current ratio being equal to the ratio of the D.-C. control turns to power winding turns. Thus the current through the second load potentiometer 40 will be a fixed multiple of the current taken from the slide 13 of the control potentiometer 10. By proper choice of A.-C. supply voltage at 22, 25 the resistance of the second potentiometer may be made equal to the resistance of the first potentiometer. Because of the inherent linearity of this type of magnetic amplifier the output variation will be small, one-half percent being a normal limit for a wide change in frequency and voltage of the A.-C. supply. The graph 45 of Fig. 2 brings out this linear relationship. A variable resistor 23 may be inserted between potentiometer 10 and control winding 15 in order to adjust the multiplying ratio of the amplifier.

The description of the circuit has been directed to a single multiplying circuit, but, obviously, a series of potentiometers in cascade may be used, the load resistor values in all units being the same without diminishing the over-all accuracy of operation. In addition to multiplication, the circuit lends itself to summing by the expedient of feeding current proportional to added quantity into an additional control winding on the amplifier. Such an arrangement is shown in Fig. 3 which will now be described.

Figure 3:
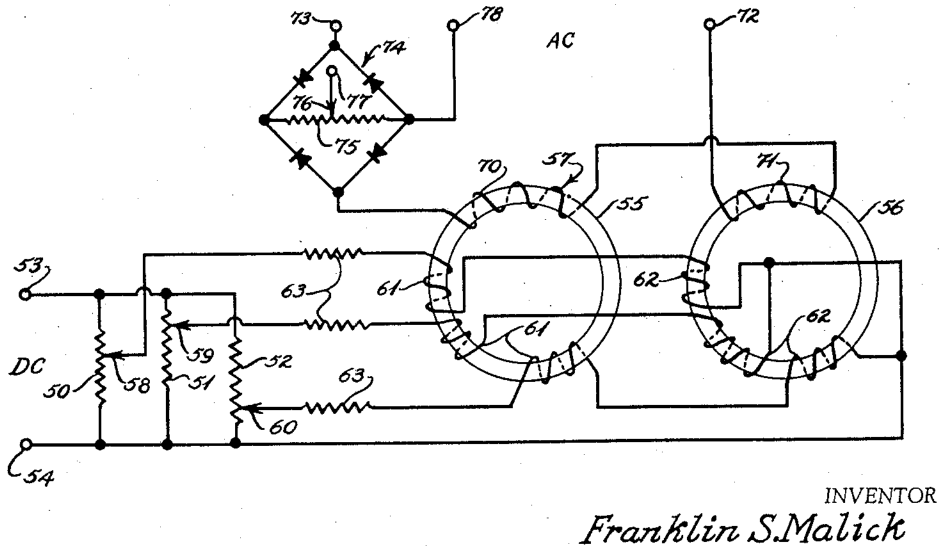
Fig. 3 is a modified circuit diagram showing application of the device to summing operations.

In Fig. 3 the control circuit includes an input potential measuring unit consisting of three potentiometers 50, 51 and 52 connected in multiple with the D.-C. source terminals 53 and 54. Two ring cores 55 and 56 are shown, for the magnetic amplifier 57, these cores being saturable. Each of the slides 58, 59 and 60 on the control potentiometers connects to input terminal 54 through one of multiplying ratio control resistors 63, and one of control windings 61 and 62. The load windings 70 and 71 are oppositely poled, winding 71 having direct connection to A.-C. source terminal 72 and winding 70 having connection to A.-C. source terminal 73 through rectifier 74. The rectifier may be of the bridge type similar to 24 in Fig. 1 and connects with the load potentiometer 75, the slide 76 connecting to one output terminal 77 with the other output terminal 78 being at one end of potentiometer 75.

In operation, to any product of an input potentiometer, as 50, a quantity may be added by feeding into one of the branch potentiometers 51 or 52 a current proportional to the quantity, the result being indicated at output terminals 77, 78.

In either arrangement it is noted that metallic electric conductor connections between stages are unnecessary at stage addition, and that only A.-C. power source is needed to supply any number of cascaded stages without undesirable interaction. Also, if servomechanism is desirable, the output impedance of the last stage may be reduced to permit this arrangement.

Obviously, other modifications are possible and it is, therefore, understood that within the scope of the appended claims the invention may be practiced otherwise than as specifically described.

I claim:

1. A computer device comprising plural first stage potentiometers, a second stage potentiometer, and a magnetic amplifier and rectifier unit connected between the potentiometers of said first and second stages, said magnetic amplifier including two saturable core members, control windings in inductive relation to said core members, each winding having connection to one of said first stage potentiometers, and load windings having circuit connections to source terminals for supply of alternating current, and said rectifier being interposed in series in said load winding circuit connections between one of said source terminals and said load winding.

2. Electrical computer apparatus in which a series of potentiometers may be used in multiplying relationship without developing excessive terminal impedance comprising first and second input terminals adapted to be connected to a source of direct current, a first potentiometer connected across said input terminals and having a variable tap, first and second load terminals, first and second source terminals adapted to be connected to a source of alternating current, rectifying means having input and output terminals, a linear magnetic amplifier having load windings and control windings, means connecting said control windings between the movable tap of said first potentiometer and said second input terminal, a second potentiometer connected across said rectifying means output terminals and having a variable tap, the impedance of said second potentiometer being substantially the same as said first potentiometer, means connecting one end of said load windings to one of said source terminals, means connecting the other end of said load windings to one of the input terminals of said rectifying means, means connecting the other input terminal of said rectifying means to the other of said source terminals, means connecting the movable tap of said second potentiometer to one of said load terminals, and means connecting the other of said load terminals to one of the output terminals of said rectifying means.

References Cited in the file of this patent

UNITED STATES PATENTS

| | | |
|---|---|---|
| 1,686,974 | Kroger | Oct. 9, 1928 |
| 2,126,790 | Logan | Aug. 16, 1938 |
| 2,157,977 | Alriq | May 9, 1939 |
| 2,177,556 | Walker | Oct. 24, 1939 |
| 2,229,952 | Whiteley et al. | Jan. 28, 1941 |
| 2,282,471 | Hedding | May 12, 1942 |
| 2,401,779 | Swartzel | June 11, 1946 |
| 2,470,556 | Hedstrom et al. | May 17, 1949 |
| 2,509,380 | Walker | May 30, 1950 |
| 2,559,611 | Garmany | July 10, 1951 |
| 2,561,329 | Ahlen | July 24, 1951 |
| 2,573,255 | Forssell | Oct. 30, 1951 |
| 2,682,632 | Cohen | June 29, 1954 |
| 2,704,823 | Storm | Mar. 22, 1955 |

OTHER REFERENCES

"The Magnetic Amplifier" (V. J. Louden), G.E. Review (March 1953), pages 22–24 relied on.